Patented Nov. 29, 1938

2,138,118

UNITED STATES PATENT OFFICE 2,138,118

TITANIUM OXIDE PIGMENTS AND PROCESS FOR PRODUCING SAME

Gordon D. Patterson, Wilmington, Del., assignor to E. I. du Pont de Nemours & Company, Wilmington, Del., a corporation of Delaware No Drawing. Application April 23, 1937, Serial No. 138,584

16 Claims. (Cl. 134—58)

This invention relates to improvements in titanium base pigments and to a process for producing novel titanium oxide pigments characterized by high chalking and discoloration resistance, and particularly adaptable for coating compositions and paints. More particularly, the invention is directed to the production of pigments containing as the main opacifying agent titanium oxide and an associated minor amount of a water-insoluble cadmium compound.

As is generally known, titanium pigments, titanium dioxide, and titanium dioxide associated with extending materials such as alkaline earth metal sulfates, silicates, etc., are not usually employed as the sole pigments in paint compositions, such as those containing linseed oil, and intended for outside use. This for the reason that such pigments have a pronounced tendency to chalk, resulting in objectionable rapid erosion or wearing away of the film. When such inert pigments are employed in outdoor paints, it is customary to add so-called "reactive" pigments to harden the film and improve its resistance against chalking. The use of a sufficient amount of reactive pigment to impart effective chalking resistance, however, will eventually cause hardening of the coating composition to such extent that the film rapidly fails due to brittleness and lack of distensibility, this being manifested by excessive cracking, checking, flaking and peeling of the film. Not only do titanium oxide pigmented compositions manifest a marked tendency to chalk and erode when exposed to outdoor weathering, but when used for indoor painting, such compositions tend to change color, characterized usually by a progressive yellowing of the film.

It is among the objects of this invention to overcome these as well as other disadvantages inherent in prior titanium pigments and compositions containing the same, and to provide for the production of novel and improved titanium oxide pigments which exhibit greater chalking resistance than straight titanium dioxide pigments and consequent greater durability of paints and compositions in which they may be contained. An additional object includes the production of a titanium pigment which will not exhibit or impart objectionable checking, cracking and flaking tendencies in paints or compositions in which they may be contained. A further object of the invention is to provide an improved titanium pigment adapted to greatly minimize and overcome the objectionable discoloration or yellowing tendencies of such pigments.

The foregoing and other important objects and advantages are obtainable in the present invention, which broadly comprises intimately associating, blending, or combining with a titanium containing pigment a minor amount of a water-insoluble cadmium compound.

In a more specific and preferred embodiment, the invention comprises intimately associating, blending or combining a small and relatively minor proportion of a basic, insoluble cadmium compound, or mixtures of the same, such as cadmium oxide, cadmium hydroxide, or cadmium carbonate, with titanium oxide or extended titanium oxide pigments.

In adapting the invention to practice, the insoluble cadmium compound may be intimately associated with or incorporated in the titanium pigment in any desired manner, such as by simple and efficient dry or wet mixing of the cadmium compound with the titanium pigment to insure uniform distribution of the cadmium compound with the pigment, or suspending the titanium dioxide in a solution of a soluble cadmium salt and then forming the cadmium compound in situ by precipitation in such manner that an insoluble cadmium compound is formed on the surface of the titanium dioxide particles.

In order that the invention may be more clearly understood, the following examples are given, each of which is merely illustrative in character and to be considered as in no wise limiting:—

Example I 4,000 parts by weight of calcined titanium dioxide of pigment quality were suspended in 16,138 parts of a cadmium chloride solution containing 183 parts of cadmium chloride. This mixture was thoroughly stirred until a smooth slurry was obtained.

80 parts of sodium hydroxide dissolved in 720 parts of water were then added, this being the chemical equivalent of the cadmium chloride in solution. Cadmium hydroxide was precipitated, which remained attached to the titanium oxide. The pigment treated in this manner contained approximately 2 mol % of cadmium hydroxide, which is equivalent to 3.6% by weight on the basis of the titanium oxide content. After thorough stirring, the pigment was filtered, dried and dry ground. The resultant pigment was a white powder which when made up into a paint gave a white paint of excellent anti-chalking and anti-yellowing tendencies.

Example II 560 parts of calcined titanium dioxide were suspended in 2500 parts of a cadmium chloride solution containing 64 parts of cadmium chloride. This mixture was thoroughly stirred until the desired smooth slurry was obtained. After thorough mixing, a solution of 37 parts of sodium carbonate was stirred into the TiO$_2$ slurry and cadmium carbonate precipitated upon the particles of TiO$_2$, the amount of cadmium carbonate being such that the pigment contained 4.76 mol % of cadmium carbonate which is equivalent to 9.15% by weight of the titanium oxide. After thorough mixing of the slurry, the product was filtered, dried, dry ground and ready for use, a white pigment resulting which exhibited good anti-chalking and anti-yellowing characteristics.

Example III 500 parts by weight of calcined titanium oxide was slurried in approximately 900 parts by weight of water. To this slurry was added a solution of cadmium sulfate containing 8.1 parts by weight of cadmium sulfate. The slurry was then thoroughly stirred to get a uniform distribution of the salt. A dilute barium hydroxide solution was then slowly added to the slurry with good agitation until an amount of barium hydroxide chemically equivalent to the cadmium sulfate had been added. The agent precipitated with the titanium oxide by this method consisted of barium sulfate and cadmium hydroxide. The slurry was then filtered and the pigment dried and pulverized, after which it was ready for use.

The pigment obtained in accordance with the foregoing example contained only a small amount of cadmium compound, and in addition to anti-chalking characteristics was particularly resistant towards yellowing.

Example IV 342 parts by weight of pigment grade titanium oxide and 183 parts by weight of cadmium oxide were dry blended, the 525 parts of so-obtained pigment then being mixed with

| | Parts |
|---|---|
| Linseed oil | 287 |
| Paste drier | 16 |
| Mineral thinner | 125 | in a suitable mill, such as a Buhrstone, roller or pebble mill. The so-prepared paint had a light tan color.

For comparative purposes, paints were also prepared substituting zinc oxide for the cadmium compound. These paints were tested on white pine panels, inclined at an angle of 45° facing south, and the tests run simultaneously so that they received identical weathering.

The zinc oxide paints had chalked and failed by checking, cracking and flaking after one year's exposure, whereas the cadmium paints were still in excellent condition, the cadmium oxide paints, particularly, exhibiting remarkable chalking resistance after three years of similar exposure.

For white paints cadmium hydroxide or cadmium carbonate may be substituted for cadmium oxide in the above composition.

The pigments obtained in accordance with my invention have been ground with linseed oil for purposes of evaluation and to form test paints which have been exposed outdoors in comparison with similar straight TiO$_2$ paints. The fact that straight TiO$_2$ paints of this type fail very rapidly allows a quick method of evaluation of other paints in comparison with TiO$_2$. My treated pigments exhibited a marked superiority over unmodified titanium oxide in chalk resistance and anti-yellowing when evaluated against untreated TiO$_2$ pigments.

While the invention has been exemplified employing specifically cadmium chloride, it is to be understood that any other soluble salt of cadmium such as the sulfate, acetate, nitrate, etc. may be used in lieu thereof.

While in the foregoing examples, such as Example I, my novel addition agent has been precipitated on the pigment particles, it may be desirable in some instances to effect precipitation separately with subsequent addition in slurry form to a slurry of the titanium pigment or the precipitate may be dried and blended with the dry TiO$_2$. However, I prefer the procedure outlined in the foregoing examples, because more intimate association of the TiO$_2$ with the insoluble cadmium compound such as cadmium hydroxide is obtained by this procedure. By first adding the titanium oxide to a solution of the cadmium salt, the titanium oxide particles are coated with a layer of adsorbed cadmium ions and the additional cadmium salts which are not adsorbed are uniformly distributed in the slurry. When the precipitating agent, such as caustic soda, sodium carbonate, etc., is then added, the insoluble cadmium compound, such as cadmium hydroxide, is uniformly distributed with and on the titanium oxide particles.

While in the foregoing examples, rather small amounts of cadmium compounds have been associated or incorporated in the titanium oxide pigment, it is to be understood that these amounts are not critical and that I do not intend to be limited to the same. By using small amounts of modifying material, pigments have been developed which have much the same opacifying power as the unmodified titanium oxide, but with the added advantage of very definitely increased resistance against chalking. The addition to or mixture of basic cadmium compounds with titanium pigments not only avoids or greatly decreases inherent chalking of the coating compositions or films containing the pigments, but overcomes objectionable yellowing as well, which is very often quite serious, particularly in indoor painting. Thus, the presence of my novel cadmium compounds in titanium pigments affords a two-fold objective, i. e., the correction of two different and distinct faults of titanium oxide pigments.

While, as indicated, relatively small amounts of basic cadmium compounds are required in the invention to give the titanium oxide the desired anti-chalking and anti-yellowing properties, I have found that sufficient and desirable effects will ensue if an amount of basic cadmium compound as low as substantially .1 mol % is used. If, however, an amount as high as substantially 10 mol % is used, the characteristic titanium oxide properties begin to be less pronounced and consequently I prefer to remain below this upper limit and within the range indicated. Most satisfactory and beneficial results ensue when an amount of substantially 1 mol % of cadmium compound is employed, and accordingly this amount is recommended as preferable for use.

Modern exterior paint compositions contain several paint ingredients, each of which adds its peculiar properties to the paint. My novel pigments can be substituted for the ordinary titanium pigment content of such compositions, conferring to the paint film greater chalking and yellowing resistance and consequently greater durability, resulting in longer life of the coat.

By the term "titanium pigment", here and in the appended claims, is meant titanium oxide, titanium oxide chemically combined with other metal oxides, such as the titanates of magnesium, calcium, strontium, barium, zinc, and cadmium, etc., as well as titanium pigments associated with extenders such as the alkaline earth metal sulfates of calcium and barium, as well as silica, magnesium silicate and silicates in general.

I claim as my invention:

1. A process for producing stable titanium pigments, comprising intimately associating with said pigments a minor amount of a substantially water-insoluble, basic cadmium compound.

2. A process for producing a titanium oxide pigment stable against chalking and discoloration, comprising intimately associating with said pigment a minor amount of a white, water-insoluble, basic cadmium compound.

3. A process for producing a titanium oxide pigment stable against chalking and discoloration, comprising intimately associating with said pigment substantially .1 mol % to 10 mol % of a white, water-insoluble basic, cadmium compound.

4. A process for producing a titanium oxide pigment stable against chalking and discoloration, comprising intimately associating with said pigment substantially 1 mol % of a white, water-insoluble, basic cadmium compound.

5. A process for producing a titanium oxide pigment stable against chalking and discoloration, comprising intimately associating with said pigment substantially 1 mol % to 10 mol % of a white, water-insoluble, basic cadmium compound.

6. A process for producing a stable, chalking and discoloration resistant titanium base pigment, comprising suspending titanium oxide in an aqueous solution of a cadmium salt, adding to said suspension a precipitating agent whereby a water-insoluble, basic cadmium compound is intimately associated with said pigment.

7. As a new article of manufacture, a titanium pigment resistant against chalking and discoloration, comprising an intimate association of titanium oxide and a water-insoluble, basic cadmium compound.

8. As a new article of manufacture, a titanium pigment resistant against chalking and discoloration, comprising an intimate association of titanium oxide and precipitated particles of a water-insoluble, basic cadmium compound.

9. As a new article of manufacture, a titanium pigment containing less than 10 mol % of a white, water-insoluble, basic cadmium compound.

10. As a new article of manufacture, a titanium pigment containing .1 to 10 mol % of a white, water-insoluble, basic cadmium compound.

11. As a new article of manufacture, a titanium pigment containing substantially 1 mol % to 10 mol % of a white, water-insoluble, basic cadmium compound.

12. As a new article of manufacture, a titanium pigment containing substantially 1 mol % of a white, water-insoluble, basic cadmium compound.

13. As a new article of manufacture, a titanium pigment stable against chalking and discoloration, containing a minor amount of cadmium hydroxide.

14. As a new article of manufacture, a titanium pigment stable against chalking and discoloration, containing a minor amount of cadmium oxide.

15. As a new article of manufacture, a titanium pigment stable against chalking and discoloration, containing a minor amount of cadmium carbonate.

16. A white pigment stable and resistant against chalking and discoloration, comprising titanium dioxide as an opacifying ingredient, and a minor amount of a white, water-insoluble, basic cadmium compound precipitated upon the particles of said titanium dixode.

GORDON D. PATTERSON.